April 16, 1940.                    P. E. PERMAN                    2,197,315
                              CENTRAL COOLING SYSTEM
                              Filed March 17, 1937          2 Sheets-Sheet 1
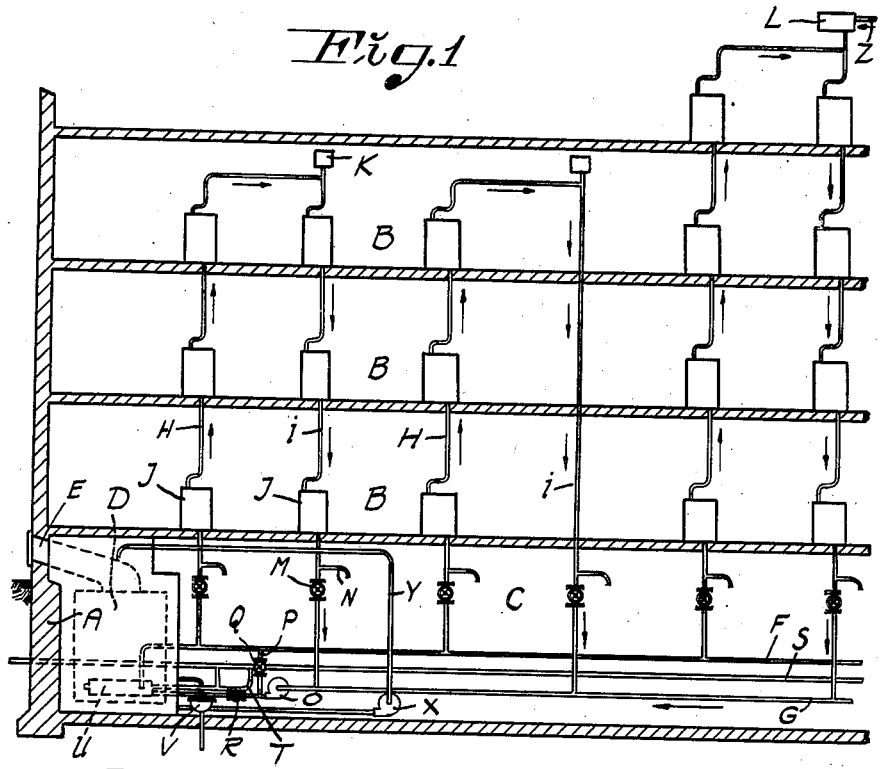
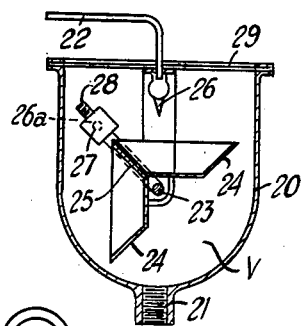
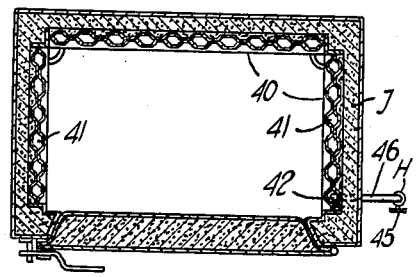
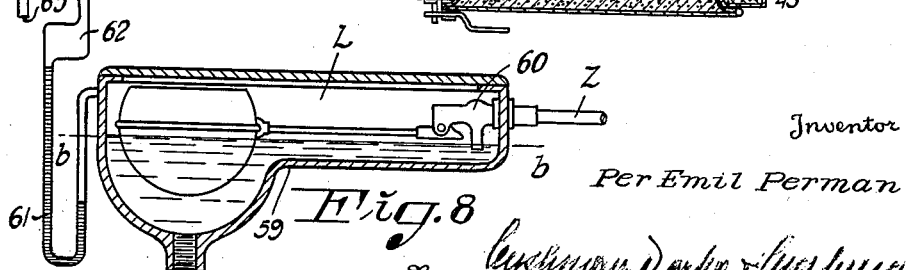
Inventor
Per Emil Perman

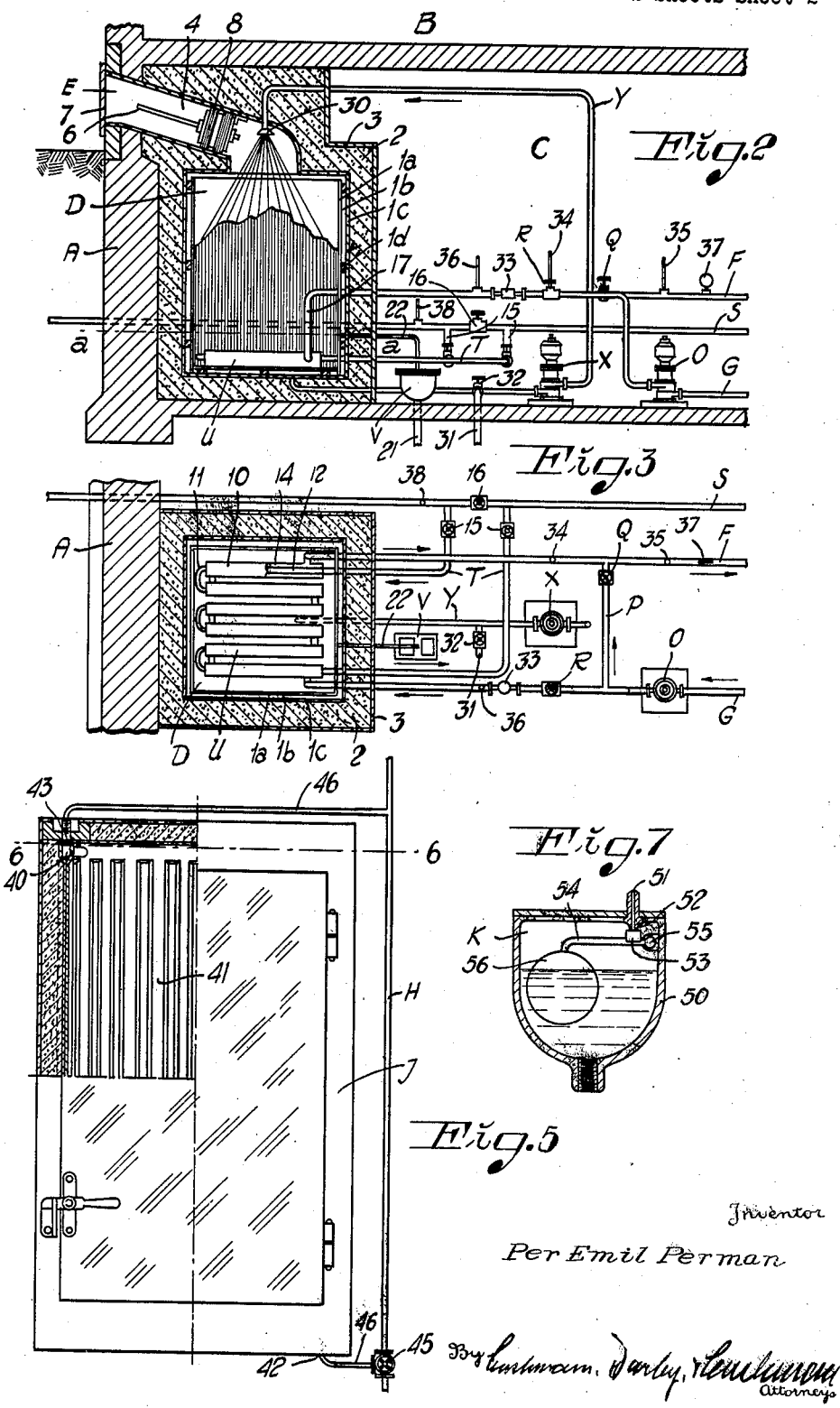

Patented Apr. 16, 1940

2,197,315

UNITED STATES PATENT OFFICE 2,197,315

CENTRAL COOLING SYSTEM

Per Emil Perman, Stockholm, Sweden, assignor of one-half to John Helge Walter, Stockholm, Sweden Application March 17, 1937, Serial No. 131,487
In Sweden September 25, 1935

8 Claims. (Cl. 62—26)

My present invention relates to central cooling systems particularly for buildings in which a cold source is disposed in the lower part of a building and connected with several refrigerators placed in the floors of the building and cooled by liquid circulating in a closed system through said refrigerators and said cold source so as to be cooled by heat exchange with the latter, for instance in a heat exchanger.

Hitherto cooling plants working on the above principles in which the cold source consists of ice contained in a storage tank have not found any application in practice. The ice storage tank is usually situated in the basement of the building where the space is very limited, especially in vertical direction. To provide such a tank of a volume sufficiently large to contain the quantity of ice required for cooling the refrigerators during a moderate length of time, the space of the basement, especially in vertical direction, must be effectively utilized causing great difficulties in charging the tank with ice. In known plants of this type the ice has to be transported first into the basement and then into the tank which requires so much manual work and, thus, involves so high cost of operation, especially in the form of cost of transportation of the ice, as to make the plant wholly uneconomical in operation. Further this manner of transportation of the ice into the tank makes the plant unreliable in operation as the charging is to an unallowably great degree dependent of the ice supply.

The principal object of my invention is to eliminate the above said difficulties and to provide a central cooling plant of the type described which is easy and reliable in operation and ensures an economical working. To this end I provide the ice storage tank with means to charge it with ice from the outside, preferably directly from the street. Thereby the cost of transportation of the ice is considerably reduced as the ice may simply be thrown down into the tank through an opening in an outer wall of the building disposed at a suitable level above the ground.

Another object of my invention is to provide a cooling plant of the type described in which the circulating liquid may be alternatively cooled by ice and by water from a water supply main, such water having during the cooler seasons a temperature sufficiently low to permit its use as cold source. To this end I provide the ice storage tank with a heat exchanger in which water from a water supply main passes in heat exchanging contact with the circulating cooling liquid. In this case the storage tank does not, of course, contain any ice, but it must be filled with water to be capable of serving as cold store. In the day-time the consumption of water from the water supply main is sufficiently great not only to impart to the circulating cooling liquid the required low temperature but also gradually to cool the bulk of water in the tank. When in the night-time the water consumption decreases or wholly ceases the water in the tank gives off its accumulated cold to the circulating cooling liquid.

A further object of my invention is to provide a cooling plant of the type described permitting an exact control of the quantity of ice delivered by the ice producer whereby it will be possible still more to reduce the cost of operation. The ice storage tank should preferably be charged with crushed ice, and hitherto the ice producer had to take special measures to weigh the ice delivered involving a tedious and expensive measuring work. To eliminate this drawback I measure the melting water instead of the crushed ice by combining the ice storage tank with a measuring apparatus by which the melting water discharged from the tank and, thus, the ice consumption is automatically measured.

These and other objects will be apparent according as the following description proceeds, reference being had to the accompanying drawings showing by way of example an embodiment of my central cooling plant.

In the drawings—

Fig. 1 is a diagrammatic vertical sectional view through an outer wall and floors of a building equipped with a central cooling plant according to my invention;

Fig. 2 is a vertical sectional view of the ice storage tank and appurtenant conduits;

Fig. 3 is a horizontal sectional view of Fig. 2;

Fig. 4 is a vertical sectional view of a water measuring apparatus;

Fig. 5 is a view partly in vertical section of a refrigerator;

Fig. 6 is a horizontal sectional view along the line 6—6 in Fig. 5;

Fig. 7 is a vertical sectional view of an automatic de-aerating valve; and

Fig. 8 is a vertical sectional view of a combined filling an de-aerating device.

As shown in Fig. 1, A designates an outer wall, B, B floors and C a basement of a building. Provided in said basement C is a tank D containing ice, preferably in crushed condition. The tank D is charged with ice through an opening E in the outer wall A disposed at a height above the ground suitable for this charging operation. Connected with the interior of the tank D are two conduits F and G serving as supply main and return main, respectively, for a cooling liquid. The cooling liquid may consist of water to which may be added chemicals serving for protection against rust or for other purposes. Coupled in parallel between said two mains F and G are a plurality of secondary conduits each extending through the several floors B of the building in the form of a hair-nail with an ascending branch H and a descending branch I. Refrigerators J in the different floors B are inserted in series in either or both of said branches H and I. At the highest point of each secondary conduit H, I is a de-aerating valve K and at the highest point of the whole circulating system is a combined automatic filling and de-aerating device L supplied with water from a water supply main Z.

At their lower portion the secondary conduits H, I are each provided with a closing valve M and a drain pipe N the latter being normally closed. The cooling liquid is positively circulated through the system in the direction indicated by the arrows by means of a pump O inserted in the return main G. The two mains F and G are connected with each other by means of a shunt conduit P including a control valve Q. Provided in the return main G in front of the ice storage tank D is another control valve R. The object of this shunt conduit will be described later on.

S designates a water supply main from which a shunt conduit T leads to a heat exchanger U which is provided in the interior of the storage tank D at the bottom thereof and in which heat is exchanged from the water of the supply main S to cooling liquid flowing from main G into main F. Valves in said shunt conduit T serve to control the connections thereof with the heat exchanger U in the manner to be described.

Further the ice storage tank D is combined with an apparatus V for measuring the belting water as well as with a separate circulating system for melting water comprising a pump X and a conduit Y connecting said pump with the top and bottom of the tank D. The object of these auxiliary means will be described later on.

The different conduits are, of course, insulated, although this is not shown in the drawings.

Before describing the mode of operation of the plant, I will describe in detail the construction of the ice storage tank D and the heat exchanger U.

As shown in Figs. 2 and 3 the ice storage tank D comprises an inner wall $1a$ and an outer wall $1c$, said walls being kept at a certain distance from each other by means of distance pieces $1d$ so as to form an air space $1b$ between them. The tank is surrounded by an insulation 2 covered by an outer casing 3. The wall $1a$ is made of insulating material such as wood, whereas the wall $1c$ may consist of sheet metal such as sheet iron. By the insulating wall $1a$, the air space $1b$ and the insulation 2 heat transfer from and to the interior of the tank is considerably reduced or eliminated.

At the top the wall $1c$ of the tank is shaped to form a channel 4 which extends into the above said opening E in the outer wall A of the building and preferably has such a width that it can serve as manhole. The channel 4 has a double closure, viz. an outer plate 7 covering the opening E and an inner heat insulated shutter 8 of any conventional type adapted to be manipulated from the outside, for instance by means of a rod 6.

As shown especially in Fig. 3, the heat exchanger U comprises a plurality of outer pipes 10 and an inner pipe coil 11 extending through said outer pipes 10 in series, the one channel 12 of the heat exchanger being formed by said inner pipe coil 11, whereas the other channel 14 is formed by the interspaces between the wall of the pipe coil 11 and the outer pipes 10 which interspaces are connected with each other to form a contiguous channel. Pipe coil 11 is connected or formed integral with the above said shunt conduit T of the water supply main S, a valve 15 being provided in each branch of said shunt conduit and a valve 16 in the main S between the places of connection thereof with the shunt branches. The channel 14 is connected with the two mains F and G which enter the tank D at a certain level above the heat exchanger and have vertically extending portions 17 in contact with the ice.

It should be observed that the conduits leading into and from the ice storage tank D are welded to the sheet iron wall $1c$ whereby the tank will be wholly water-proof so that no leakage whatever of water or liquid into the basement can occur.

The mode of operation of the plant is as follows:

The ice storage tank D which preferably should be capable of holding ice of a quantity required for cooling the refrigerators J during 24 to 48 hours is charged with ice from the outside through opening E after the removal of plate 7 and shutter 8. Valves 15 are closed and valve 16 opened in which case no water from main S is permitted to flow through channel 12 of the heat exchanger, but if it is desired also to cool the water of said main, valves 15 may be opened and valve 16 closed. Pump O is started causing cooling liquid to be circulated from return main G, through channel 14 of the heat exchanger U, supply main F, secondary conduits H, I with refrigerators J and back to return main G. During the passage through the heat exchanger U which may be situated below the level $a$—$a$ of the melting water and through the vertical portions 17 of the mains F and G lying within the tank D the cooling liquid absorbs cold through the walls of pipes 10 directly from the ice and indirectly from the melting water.

In a cooling plant according to the invention a constant temperature in the refrigerators J can be maintained as low as $+3°$ C. However such a low temperature is unfavourable with regard to the foods such as meat, fish, fruit and the like to be stored in the refrigerators as at such low temperature the foods lose moisture and thereby in quality. In the refrigerators the temperature should be so high that the foods do not become dry, but on the other hand so low as is required from a bacteriological point of view. A suitable value of the temperature is about $+8°$ C. In order to be able to raise the temperature in the refrigerators at will, the above said shunt conduit P is utilized in such manner that part of the warm cooling liquid from return main G is conducted directly into the supply main F without passing through the heat exchanger U. This warm cooling liquid raises the temperature of the liquid in main F and thereby in the refrigerators. Thus, the temperature control consists of adapting the quantity of cooling liquid supplied through shunt conduit P which is effected by suitably setting the valves Q and R.

When during the cooler seasons water from the water supply main S can be used as cold source valves 15 are opened and valve 16 closed causing cold water from main S to pass through shunt conduit T and channel 12 of the heat exchanger U so as to give off cold to the cooling liquid passing through channel 14 of said exchanger. When using cold water as cold source tank D should be filled with water, said bulk of water serving as cold store to compensate the uneven consumption of cold water during day-time and night-time as previously explained. Evidently, when the plant is operating in this manner the cost of operation is reduced as the ice cost is eliminated.

As stated above my improved central cooling plant is equipped with an apparatus V for measuring the melting water, said apparatus being shown in detail in Fig. 4.

The apparatus comprises a casing 20 provided with an outlet 21 at its lowest point and connected with the ice storage tank D by means of a pipe 22 which is arranged at the desired level a—a of the melting water in said tank (see Fig. 2). Mounted in the casing is a shaft 23 carrying two cups 24 which are displaced substantially 90° in relation to each other so that when one of the cups assumes horizontal position beneath the supply pipe 22 the other cup assumes vertical position. Shaft 23 is located at a certain distance below the centre of gravity 25 of the combined cups. When the cup which assumes horizontal position beneath the pipe 22 has been filled with melting water to a predetermined level, the centre of gravity 25 is so displaced as to cause tilting of the cups around shaft 23, whereby the filled cup is emptied into casing 20 and through outlet 21 into the nearest sewer main, whereas the other cup is brought into filling position and so on. A counter serves to record the number of tilting motions. This counter which is not illustrated in the drawings as forming no part of my invention may consist of an ordinary counter capable of receiving step by step entries in one digital order at a time and provided with a ratchet and pawl mechanism, the pawl of which is indicated at 26 in Fig. 4 and adapted to be operated by a pin 26a on the tiltable parts so as to move the ratchet wheel one step for every second tilting motion. By means of a weight in the form of a nut 27 threaded on a rod 28 connected with the cups the degree of filling of the cups may be varied, a suitable volume being one litre. Evidently the cups should be exactly balanced so as to contain the same quantity of liquid at the moment of tilting. The top 29 of casing 20 may be made of transparent material such as glass, Celluloid or the like so that the function of the apparatus can be supervised and the counter read off.

As stated above this measuring apparatus forms a simple and automatic means to control the ice consumption. When the plant is started the apparatus is examined by the ice producer and the landlord of the building and then sealed by the former. To determine the ice consumption it is only necessary to read off the counter 26 which indicates the number of double tilting motions of the cups, and by multiplying this number by the double volume of a cup, the volume of melting water and thereby the weight of the ice consumed is obtained directly. By using such an automatic measuring apparatus it is no longer necessary for the ice producer to weigh the crushed ice delivered, nor to perform the deliveries only at given points of time. Hereby his cost of distribution is reduced so that he is able to sell the ice at a considerably lower price causing a corresponding reduction of the cost of operation of the plant.

In the transmission of great quantities of cold it may happen that the convection in the bulk of melting water is too low and, thus, the temperature thereof becomes too high. A separate circulating system for the melting water serves to eliminate this drawback. As previously stated this system comprises a pump X and a conduit Y extending from the bottom of the ice storage tank D and ending in a spray nozzle 30 above the ice in said tank. The melting water is circulated by the pump X through substantially the whole bulk of ice and is thereby cooled down to the vicinity of 0°. To empty the ice storage tank D a drain pipe 31 controlled by a valve 32 may be provided in conduit Y, preferably at the lowest point thereof.

The cooling plant may be provided with auxiliary apparatuses which are advantageous for the management of the plant although they are not obsolutely necessary. Such apparatuses are for instance an apparatus 33 for measuring the quantity of cooling liquid passing through the heat exchanger, thermometers 34 and 35 in the supply main F in front of and behind the shunt conduit P, a thermometer 36 in the return main G, a pressure gauge 37 in the supply main F and a thermometer 38 in the water supply main S.

An embodiment of a refrigerator is illustrated in detail in Figs. 5 and 6. As shown, the inner surfaces of the refrigerator J consists wholly or in part of radiators of the so-called panel type having upper and lower collecting channels 40 and distributing channels 41 therebetween. Inlet 42 and outlet 43 (or vice versa) for cooling liquid are provided at two diagonally opposite corners of the radiators. Thereby all liquid particles have equally long way from the inlet to the outlet causing an even distribution of the cooling liquid over the whole cooling surface. The inlet 42 as well as the outlet 43 may be countersunk within the outer contour of the refrigerator as shown in Fig. 5 with respect to outlet 43 so as to permit insertion of the refrigerator into an opening in the kitchen furnishment exactly suited to the dimensions of the refrigerator before the pipe connections between the floors are established.

In certain cases it may be suitable to connect the refrigerators with the secondary conduits H, I by means of shunt conduits. Such an arrangement is shown in Fig. 5 in which a three-way cock 45 or similar device is provided at one place of connection between a secondary conduit H and a shunt conduit 46 whereby the refrigerator may be connected with or disconnected from the supply conduit H.

The automatic de-aerating valve K provided at the highest point of each secondary conduit H, I is shown in detail in Fig. 7. This valve comprises a pressure bell 50 having a de-aerating channel 51 with a valve seat 52 for a plug 53 on a lever 54 which is pivoted at 55 and carries at its free end a float 56. A certain over-pressure prevails in the bell 50. When the quantity of air in the bell increases, the water level sinks whereby lever 54 is turned counter-clockwise under the action of the float 56 causing plug 53 to leave the seat 52 so that the channel 51 is opened and de-aeration takes place. This causes the water level to rise whereby the channel 51 is again closed so that further escape of air is prevented. Evidently, this de-aerating valve K prevents also discharge of liquid.

The combined filling and de-aerating device L provided at the highest point of the whole circulating system is shown in detail in Fig. 8. The device has the form of a closed receptacle 59 containing a float valve 60 which controls the supply of cooling liquid from the supply main Z, said valve opening said supply at a given liquid level b—b in the vessel. Similar to valve K this device L operates at a certain over-pressure. In order to keep this pressure constant the vessel is connected with a pressure gauge consisting preferably of a U-pipe 61 filled with mercury to a suitable height. The free shank of the pipe is shaped to form a chamber 62 and an overflow 63. The chamber 62 prevents mercury from being pressed out through the U-pipe but does not prevent air and cooling liquid from being pressed out through the over-flow. Thus, the mercury pressure gauge acts as a safety valve for the pressure within the vessel L, that is as de-aerating valve, but at the same time as a safety outlet, if the float valve becomes leaky.

I desire to comprehend within my invention such modifications as may be embraced within my claims and the scope of my invention. Although throughout the specification I have referred to refrigerators, I wish to point out that my invention also includes cooling bodies or coolers other than real refrigerators, such as cold radiators, for instance for cooling the air of the rooms of a building.

What I claim is:

1. In the combination of a building having an outer wall, and a central cooling system, a central cooling system comprising an ice storage tank situated in the lower part of the building and having an opening at its top, an ice charging channel connecting said opening with an opening in the outer wall, a plurality of refrigerators having means for conducting a cooling liquid therethrough, means for circulating a cooling liquid in closed circuit in indirect heat exchanging contact with the interior of the tank and through said cooling means, and independent means for circulating the melting water through the ice storage tank.

2. In the combination of a building having an outer wall, and a central cooling system, a central cooling system comprising an ice storage tank situated in the lower part of the building and having an opening at its top, an ice charging channel connecting said opening with an opening in the outer wall, a pipe in said tank in heat exchanging contact with the interior thereof, a supply main and a return main communicating with said pipe, a plurality of refrigerators having means for conducting a cooling liquid therethrough, conduits connecting said cooling means of the refrigerators with the pipe in the tank, means for circulating a cooling liquid in closed circuit through said pipe and said cooling means of the refrigerators, said circulating means including a valve-controlled conduit communicating said mains with each other.

3. In the combination of a building having an outer wall, a basement and a plurality of floors, and a central cooling system, a central cooling system comprising an ice storage tank situated in said basement and having an opening at its top, an ice charging channel connecting said opening with an opening in the outer wall, a pipe in said tank in heat exchanging contact with the interior thereof, a plurality of refrigerators in the different floors having means for conducting a cooling liquid therethrough, a supply main and a return main connected with said pipe, a plurality of secondary conduits extending between said mains and each connecting a plurality of said refrigerators in series, means for circulating a cooling liquid in closed circuit through said pipe, supply main, secondary conduits, cooling means of the refrigerators, return main and back to the pipe, and a valve-controlled by-pass conduit connecting said mains in shunt to said pipe.

4. In the combination of a building having an outer wall and a water supply main, and a central cooling system, a central cooling system comprising an ice storage tank situated in the lower part of the building and having an opening at its top, an ice charging channel connecting said opening with an opening in the outer wall, a heat exchanger within said tank comprising two channels separated by a heat transmitting surface, a plurality of refrigerators having means for conducting a cooling liquid therethrough, conduits connecting said cooling means of the refrigerators with one of the channels of the heat exchanger, means connecting the other channel with said water supply main for passing water therethrough, and means for circulating a cooling liquid through said first-mentioned channel and said cooling means.

5. A central cooling system according to claim 4, wherein the means for connecting the channel of the heat exchanger with the water supply main is valve-controlled.

6. A central cooling system according to claim 4, wherein the heat exchanger comprises an inner channel and an outer channel surrounding said inner channel and being in heat exchanging contact with the interior of the tank, said inner channel being connected with the water supply main, whereas said outer channel is connected with the refrigerators.

7. In the combination of a building having an outer wall, a basement, a plurality of floors and a water supply main, and a central cooling system, a central cooling system comprising an ice storage tank situated in said basement and having an opening at its top, an ice charging channel connecting said opening with an opening in the outer wall, a heat exchanger within said tank in the lower part thereof, said heat exchanger comprising two channels separated by a heat transmitting wall, a plurality of refrigerators in the different floors having their inner surfaces formed as radiators, conduits connecting said radiators with one of the channels of the heat exchanger, a valve-controlled conduit connecting the other channel with the water supply main, means for circulating a cooling liquid through the first-mentioned channel and said radiators, an over-flow for melting water in the ice storage tank, and automatic means connected with said overflow for measuring said melting water.

8. In the combination of a building having an outer wall and a water supply main, and a central cooling system, a central cooling system comprising an ice storage tank situated in the lower part of the building and having an opening at its top, an ice charging channel connecting said opening with an opening in the outer wall, a heat exchanger within said tank comprising an inner channel and an outer channel surrounding said inner channel and being in heat exchanging contact with the interior of the tank, a plurality of cooling bodies adapted for conducting a cooling liquid therethrough, conduits connecting said cooling bodies with the outer channel of the heat exchanger, conduits connecting the water supply main with the inner channel of the heat exchanger, and means for circulating a cooling liquid through said outer channel and said cooling bodies.

PER EMIL PERMAN.